(No Model.)  2 Sheets—Sheet 1.
R. S. BROWNLOW.
CONSTRUCTION OF APPARATUS FOR SOFTENING AND PURIFYING WATER.
No. 461,664. Patented Oct. 20, 1891.
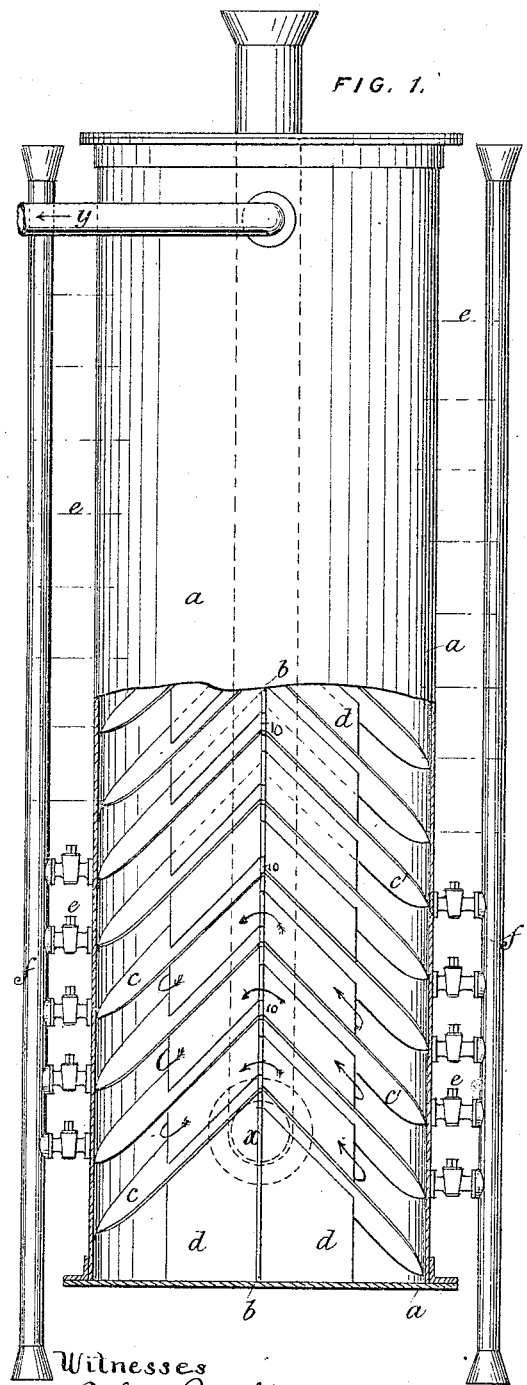
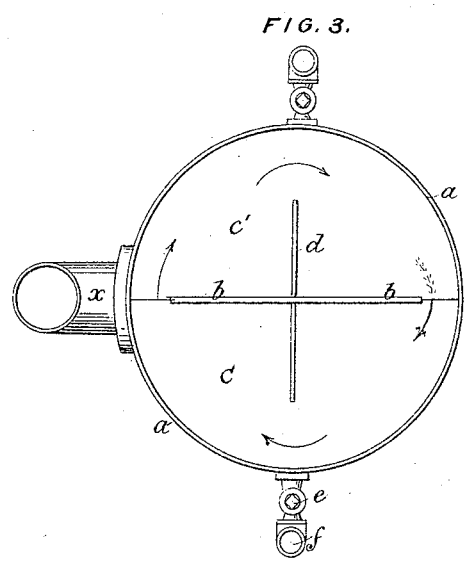
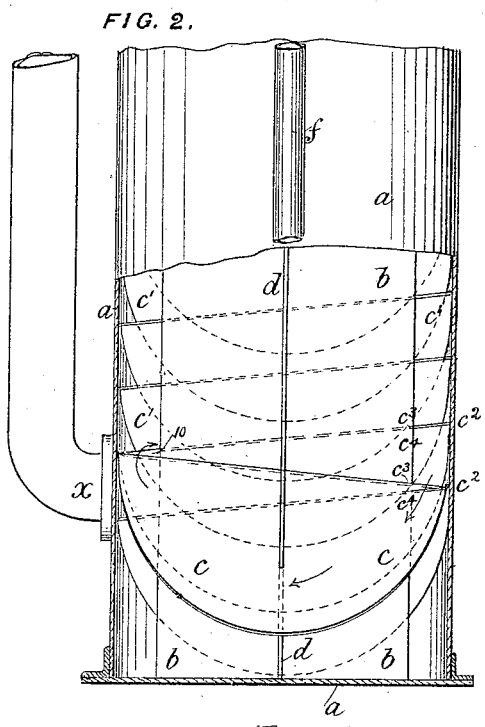
Witnesses
John Revell
George Baumann
Inventor
Richard S. Brownlow
By his Attorneys
Howson and Howson (No Model.) 2 Sheets—Sheet 2.
R. S. BROWNLOW.
CONSTRUCTION OF APPARATUS FOR SOFTENING AND PURIFYING WATER.
No. 461,664. Patented Oct. 20, 1891.
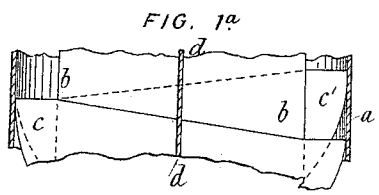
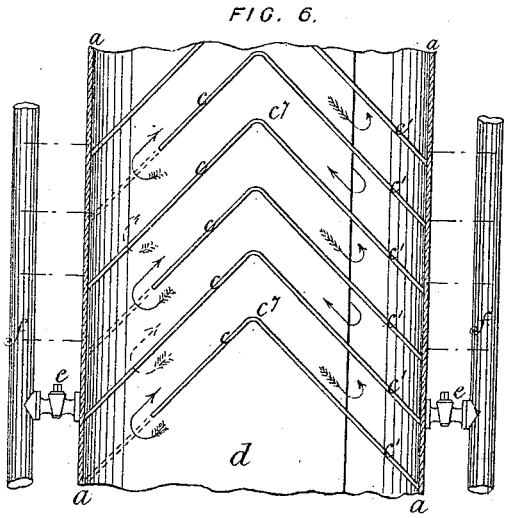
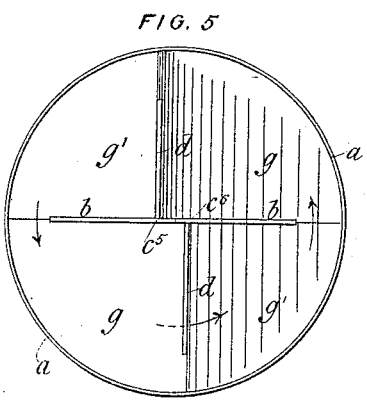
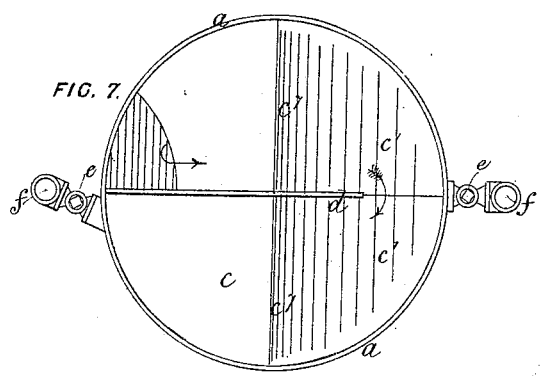
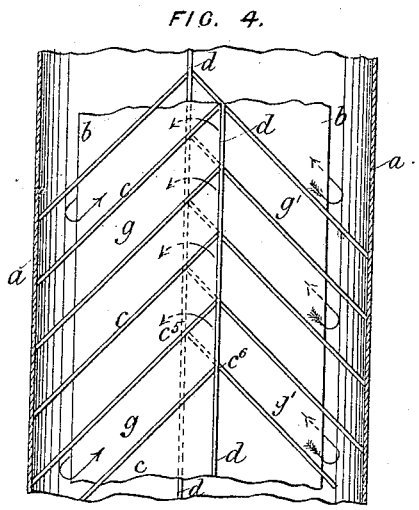
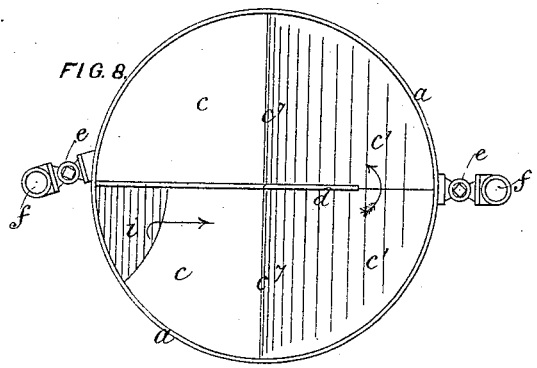
Witnesses
John Revell
George Baumann
Inventor
Richard S. Brownlow
By his Attorneys
Howson and Howson

UNITED STATES PATENT OFFICE.

RICHARD SYDNEY BROWNLOW, OF MANCHESTER, ENGLAND.

CONSTRUCTION OF APPARATUS FOR SOFTENING AND PURIFYING WATER.

SPECIFICATION forming part of Letters Patent No. 461,664, dated October 20, 1891.

Application filed November 4, 1890. Serial No. 370,285. (No model.)

*To all whom it may concern:*

Be it known that I, RICHARD SYDNEY BROWNLOW, a subject of the Queen of Great Britain and Ireland, and residing at Manchester, in the county of Lancaster, have invented Improvements in the Construction of Apparatus for Softening and Purifying Water, of which the following is a specification.

This invention relates chiefly to apparatus employed in the purification of water by the addition thereto of chemical reagents, which cause the precipitation in a solid or flocculent form of the impurities contained therein; but it is also applicable to the purification of any water or fluid containing precipitable matter.

The object of my invention is to so construct the apparatus as to compel the fluid to take a much more devious course than usual and to present a great number of precipitating surfaces or inclines.

In the accompanying drawings, Figure 1 is a front elevation of an apparatus made according to my invention, the casing only being in section. Fig. 2 is a side elevation of the same, all but the lowest of the plates (marked $c$) being removed and the casing being in section. Fig. 3 is a sectional plan view of the apparatus. Figs. $1^a$, 4, and 6 show in vertical section, and Figs. 5, 7, and 8 in plan view, modifications hereinafter referred to.

I form a vertical chamber (preferably cylindrical) and I partially divide the same by a vertical diaphragm or midfeather passing through or near the center of the vessel, or I otherwise provide the chamber with a vertical central division.

On the drawings, $a$ is the cylindrical casing, and $b$ is the vertical division-plate or midfeather. On each side of this division-plate $b$ I fix a series of baffle-plates $c$ and $c'$, sloping downward, as shown in Fig. 1, and semi-elliptical in shape, so as to entirely cover the space between the plate or midfeather $b$ and the corresponding half of the cylinder $a$. (See also plan, Fig. 3.) These plates $c$ and $c'$, as well as being sloped downward from the division $b$, as shown at Fig. 1, are set at a slight inclination, as shown at Fig. 2, the upper edges of the plates $c$ all being inclined in one direction and being parallel, or nearly so, while those of the plates $c'$ are inclined in the contrary direction. The inclination is such that the edges of each plate $c$ touch outside the division-plate $b$ the edges of two adjacent plates $c'$, which are on the other side of the division-plate, and similarly the edges of each plate $c'$ touch the edges of two adjacent plates $c$ outside the division-plate $b$. The very small triangular spaces $c^2$ $c^3$ $c^4$ are filled in by bending over part of one or both adjoining plates where they touch, or by a small piece 10, Figs. 1 and 2, fixed to or forming part of the partition; but the trapezoidal spaces $c^2$ $c^4$ $c^3$ $c^2$ are left open, and these latter spaces occurring alternately at either edge of the vertical division-plate $b$ and at a gradually-rising level will cause the water admitted at $x$ to flow first to one side of the division $b$ and then to the other, and to rise in so doing by a series of inclined lifts to the outlet $y$, (see Figs. 1 and 2,) or the upper edges of the plates $c$ $c'$ may be so cut that they correspond with each other exactly at the edge of the division $b$, in which case no triangular spaces are formed. (See diagram, Fig. $1^a$.) I also place division-plates $d$ at right angles to the plate $b$, or thereabout, the plates $d$ passing through the plates $c$ $c'$, as shown more clearly in Fig. 3, or I otherwise prevent the fluid from passing straight from edge to edge of the said plate $b$, so that it must alternately rise and descend as it passes from one side to the other of the partition $b$ in the direction indicated by the arrows on Figs. 1, 2, and 3.

The precipitated impurities collect in the pockets formed by the lowest portions of the inclined shelves, whence they can be drawn off or ejected through the taps $e$ into the pipes $f$.

The vessel $a$, instead of being cylindrical, may be of any other suitable shape, the baffle-plates being of course suitably formed.

The plates $c$ and $c'$, instead of being inclined, as shown at Fig. 2, and touching the division $b$ in a straight line all along their inner edges, may be made as shown at Figs. 4 and 5, so as to meet each other at about right angles in horizontal lines offset from each other. To accomplish this, each plate $c$ and $c'$ has its upper part cut, as shown in Fig. 5, one half of its upper edge being cut lower than the other half, so that the shorter half of each plate $c$ will unite with the longer half of one plate $c'$; but the longer half of the same plate $c$ will join the shorter half of the next higher plate $c'$, as indicated in Fig. 4. The two halves of the several plates $c$ and $c'$ are separated by the plate $b$, as seen on the drawings, and the fluid passes upward and downward and round the outer edges of the plate $b$, as indicated by the arrows, gradually rising up in the vessel $a$, as the ascending passages $g$ are longer than the descending ones $g'$. In this case the plate $d$ may be dispensed with, if desired.

Figs. 6, 7, and 8 show how, instead of circling round the plates $b$ and $d$, the fluid may be made to pass first on one side and then on the other side of a partition-plate $d$, (either provided with or without vertical plates at about right angles thereto,) by making each inclined plate $c$ meet its opposite plate $c'$ at about right angles in a horizontal diametrical line at the center of the vessel, as at $c^7 c^7$, Figs. 7 and 8. In the drawings the plates $c c'$ in this modification are shown as joined in one at $c^7$. In this case the partition $d$ touches the wall of the vessel $a$ at one edge, and at or near this point of junction spaces $i$ are cut away in the plates $c$ alternately at either side of the partition $d$, as seen by the plan views of adjacent plates at Figs. 7 and 8, so that the fluid takes a reversed course above each pair of plates $c c'$, the water rising through the spaces $i$, as shown by the arrows on Figs. 6, 7, and 8.

The taps $e$ for the removal of the deposit are arranged on opposite sides of the vessel, as shown.

In all these arrangements it will be seen that the fluid is made to rise through the vessel $a$ with an upward and downward and at the same time either continuously circulating or alternately reversed motion.

I am aware that inclined plates (parallel or otherwise) have been arranged in a settling or precipitating chamber to cause the fluid to take an upward and downward or serpentine course as it ascends or descends, and the fluid has also been caused to take a continuously circulating upward motion. I therefore make no claim to such arrangements; but

I claim as my invention—

1. The combination, in a vertically-placed vessel, of superposed plates or planes inclined from a central line outward in opposite directions to the edges of the vessel and forming passages sloping alternately upward and downward, with a vertical division and communications between such adjacent passages, whereby the liquid in passing up through the vessel is caused to circulate over the plates or planes first on one side of the vertical division-plate and then on the other, substantially as set forth.

2. The combination, in a vertically-placed vessel, of superposed plates or planes inclined from a central line outward in opposite directions to the sides of the vessel and forming passages sloping alternately upward and downward, with a vertical division, each such passage communicating at one side with the one above and at the other side with the one below, whereby fluid is caused to rise through the vessel with an upward and downward and at the same time continuously-circulating motion around the vertical division, substantially as set forth.

3. A liquid-purifying apparatus consisting of a vertical vessel provided with a vertical division-plate in the center of the vessel and sloping inclined baffling-plates, each baffling-plate at the two ends of its upper edge outside the division-plate meeting the two adjacent plates, which are on the opposite side of said division-plate, substantially as set forth.

In testimony whereof I have signed my name to this specification in the presence of two subscribing witnesses.

RICHARD SYDNEY BROWNLOW.

Witnesses:
JNO. HUGHES,
J. E. HUGHES.